F. B. DAVENPORT.
AUTOMATIC STARTING AND STOPPING DEVICE.
APPLICATION FILED OCT. 13, 1914.
1,138,458.
Patented May 4, 1915.
2 SHEETS—SHEET 1.
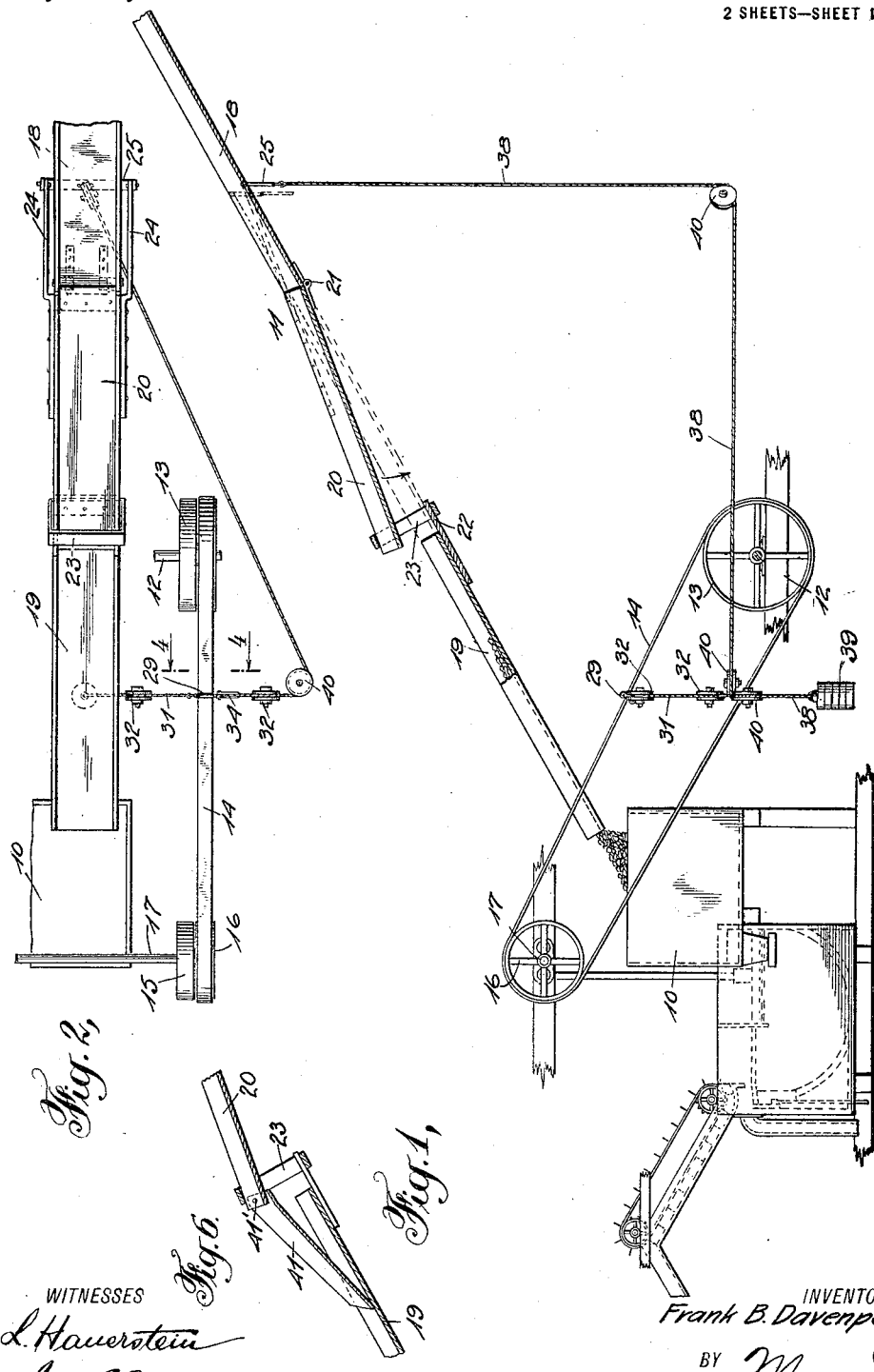
WITNESSES
L. Hauerstein
Geo. L. Beeler
INVENTOR
Frank B. Davenport
BY
ATTORNEYS F. B. DAVENPORT.
AUTOMATIC STARTING AND STOPPING DEVICE.
APPLICATION FILED OCT. 13, 1914.
1,138,458.
Patented May 4, 1915.
2 SHEETS—SHEET 2.
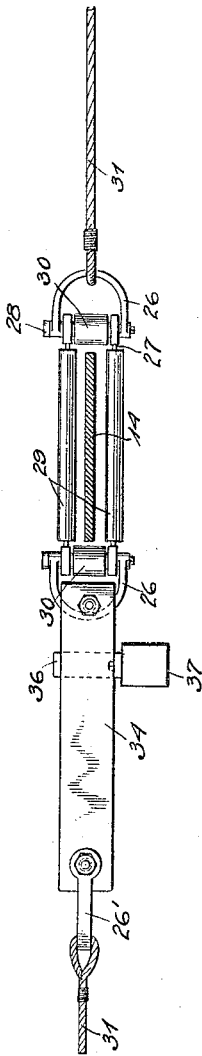
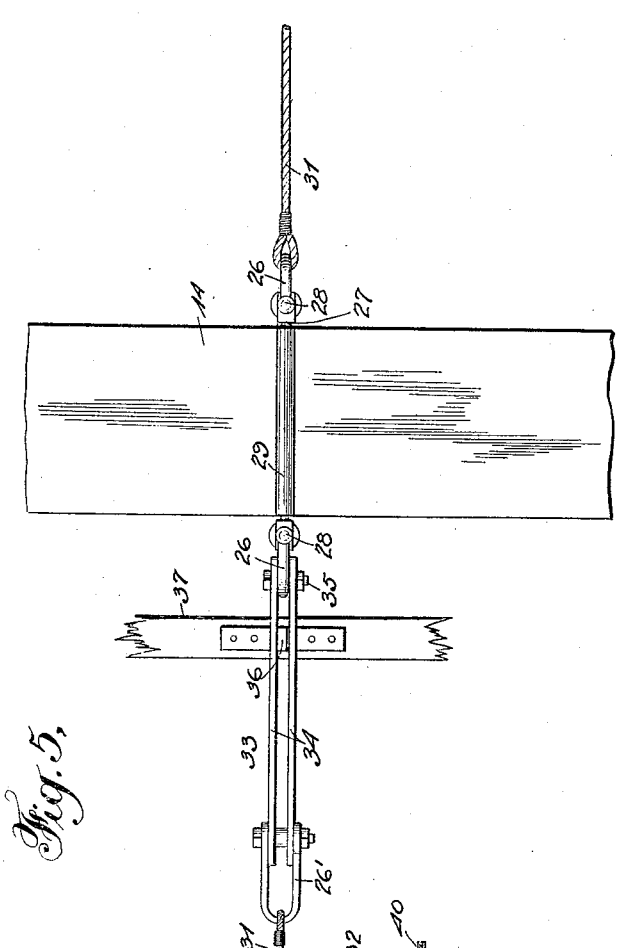
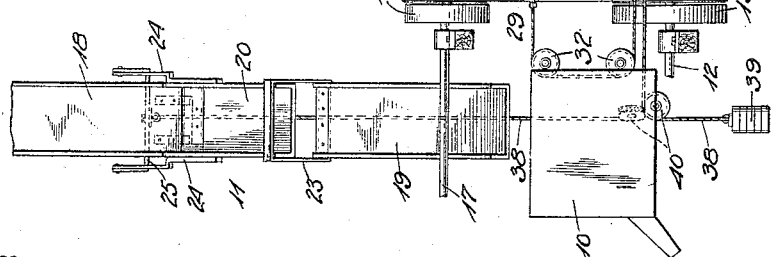
WITNESSES
INVENTOR
Frank B. Davenport
BY
ATTORNEYS

UNITED STATES PATENT OFFICE.

FRANK BELIN DAVENPORT, OF WILKES-BARRE, PENNSYLVANIA.

AUTOMATIC STARTING AND STOPPING DEVICE.

1,138,458.  Specification of Letters Patent.  Patented May 4, 1915.

Application filed October 13, 1914. Serial No. 866,454.

*To all whom it may concern:*

Be it known that I, FRANK B. DAVENPORT, a citizen of the United States, and a resident of Wilkes-Barre, in the county of Luzerne and State of Pennsylvania, have invented a new and Improved Automatic Starting and Stopping Device, of which the following is a full, clear, and exact description.

This invention relates to means for controlling the operation of machinery, and has particular reference to means for automatically shifting the belt of a belt driven machine from the tight to the loose pulley or vice versa, depending upon the mass of material moving toward the machine.

More definitely stated, my invention pertains to machinery for treating ores such, for example, as coal jigs, and in order to stop the operation of the machine in the event of stoppage of the material being delivered into the machine, I provide a shiftable belt connected between the jig shaft and the machine pulley, and also I provide an automatically operated chute constituting a part of the means for delivering material to the machine, such chute member being movable automatically in one direction when empty and in another direction when loaded, whereby the automatic stopping and starting of the machine may be effected in a practical and satisfactory manner.

The foregoing and other objects of the invention will hereinafter be more fully described and claimed and illustrated in the drawings forming a part of this specification in which like characters of reference indicate corresponding parts in all the views, and in which—

Figure 1 is a side elevation of a diagrammatic representation of a preferred embodiment of this invention applied to a coal jig; Fig. 2 is a plan view of the principal parts of the same; Fig. 3 is a front elevation looking toward the right in Fig. 1; Fig. 4 is a transverse sectional detail on the line 4—4 of Fig. 2; Fig. 5 is a plan view of the same, and Fig. 6 is a detail of a slight modification.

The several parts of this device may be made of any suitable materials, and the relative sizes and proportions, as well as the general design of the mechanism, may be varied to a considerable extent without departing from the spirit of the invention hereinafter more fully set forth and specifically claimed. I wish it to be understood also that while I refer to the representation of a coal jig for the purpose of exemplifying the construction and operation of my improvement, such reference is to be interpreted broadly, since the improvement is adapted for use on many different types of machinery.

At 10 is shown the receiving hopper of a machine which may be intended for the treatment of ore or coal, the material to be treated being delivered into said hopper by gravity or otherwise through a chute indicated generally at 11.

At 12 is shown a power or jack shaft to which is secured a large wide pulley 13. A belt 14 operates over this pulley 13 and over a pair of tight and loose pulleys 15 and 16 mounted upon a shaft 17. Obviously the shafts and pulleys just described may be variously located or related with respect to the machine, my improvement being of such a nature as to readily adapt itself to such driving belt mechanism irrespective of the precise location or relation thereof.

In the practical operation of certain types of machines, such as coal jigs, it is desirable that there will always be a certain quantity of material in the machine even though the supply to the hopper should fail temporarily. The usual practice, therefore, is to engage an operator to watch the condition of the mass of material and start or stop the machine accordingly. This expedient, however, is troublesome and expensive and quite unnecessary with the equipment herein fully explained.

Of the chute construction above referred to, the sections 18 and 19 are stationary and spaced from each other. The space referred to is bridged by an automatically movable chute section 20, the same being hinged at 21 at its upper end to the lower end of the stationary section 18. The lower end of the movable sections 20 is adapted in one position to rest upon a plate or flange 22 secured to and extending upwardly beyond the upper end of the lowermost section 19 of the chute. When the movable section 20 is down or in engagement with the plate 22, it is in alinement with the other chute sections and in such position as to convey the material freely therealong and into the hopper 10. The movement of the section 20 downwardly is limited by said plate 22, and at 23 is indicated a keeper or guide in the nature of an upwardly projecting yoke having loose embracing engagement with the lower end of the section 20. This keeper, therefore, constitutes a means to limit the upward movement of the chute 20 to a predetermined distance.

At 24 I show a pair of lever arms rigidly secured to the movable section 20 of the chute and extending preferably upwardly or rearwardly therefrom with respect to the fulcrum or hinge 21. Said arms extend preferably in the same plane, and to their free ends is connected a bail 25 which extends downwardly therefrom.

The driving belt 14 operates through an antifriction guide member shown in detail in Figs. 4 and 5, the same comprising a pair of clevises 26, draft rods 27, pins 28 connecting the draft rods to the clevises, and antifriction rollers 29 and 30 journaled on the rods and pins respectively. A flexible member, shown as a rope or cable 31, and operating over suitably arranged fixed direction pulleys 32, is adapted to determine the position of said antifriction guide member. The ends of said cable 31 may be connected to said clevises, or a specially designed slide 33 may be interposed between one of the ends of the rope and one of the clevises. This slide member comprises a pair of parallel plates 34 connected at one end by means of a pin 35 to one of the clevises 26, and at its other end is connected to the cable 31 by means of a clevis 26'. These bars or plates 34 coöperate with a fixed stud or finger 36 extending perpendicularly from a rigid support 37 adjacent the run of the belt. The length of the bars 34 is such as to permit shifting of the belt from the loose to the tight pulley and vice versa. The slide and guide just described operate in a line transverse to the running part of the belt, but the direction pulleys 32 obviously may be variously related to one another or the other parts of the machine according to the exigencies of any particular occasion.

At 38 I show a rope connected at one end to the bail 25, and at its other end is arranged a counterweight 39 of variable heft, the same including a series of removable weights.

At 40 I show a series of direction pulleys over which the counterweight rope 38 operates, such pulleys being adapted to be located wherever desired, according to the work to be done. As shown best in Fig. 3, one portion of the counterweight rope operates parallel to a portion of the endless rope 31, and a clamp 41 serves to connect these two ropes whereby the latter may be operated from the former for the purpose of shifting the belt in either direction.

Having thus set forth the preferred means for constructing the device, its operation may be briefly summarized as follows: The movable chute section in the position shown in full lines in Fig. 1 is empty; that is to say, there is no material being delivered from the chute section 18. As soon, therefore, as the member 20 runs empty or practically empty during the operation of the machine, the counterweight 39, acting through the cable 38, lifts the movable chute section from its normal position shown in dotted lines in Fig. 1 to its elevated position. While this shifting is taking place through the rope 38, the belt 14 is shifted from the tight pulley 15 to the loose pulley 16, stopping the machine while there yet remains a certain quantity of material within the hopper and perhaps in the lowermost chute section 19. While the movable chute section 20 is in its elevated position, the extent of movement upwardly thereof, according to the angle desired therefor, and the extent of shifting movement of the belt being limited by the keeper 23, any stray particles of material may be collected thereon, and when the flow of material from the section 18 is again commenced to a sufficient rate or until the weight or mass thereof collecting upon the movable section 20 is enough, it will be swung down again to its normal position into alinement with the section 19, and the action of this section and the arms 24, due to the weight of the material in the movable section, will be to cause the shifting of the belt again to the tight pulley, such weight of material in the chute 20 overbalancing the effect of the counterweight 39. It will thus be seen that the operation of the machine will be controlled automatically by the flow of material toward the hopper thereof and that at no time will the machine be entirely emptied of the material.

The purpose of Fig. 6 is to indicate a sort of apron 41 pivotally connected at 41' to the lower end of the movable chute section 20, the lower end of the apron being slidable along the inside of the fixed section 19. The purpose of this apron, which may be used in certain instances, is to eliminate the drop of material, such as coal, from the end of the movable chute while it is elevated, and in the act of assuming the loaded position. It will also prevent lumps of material from getting under the end of the movable chute and interfering in any way with the proper operation of the device.

I claim:—

1. The combination with a machine for treating material and power devices to operate the same, of a chute serving to deliver material into the machine through the action of gravity, said chute including a movable section, the position of which is determined by the mass of material passing therethrough, and connections between said movable chute section and said power devices whereby, when the chute is empty, the machine will be thrown out of action.

2. The combination with a machine adapted to treat material and power devices for operating the same including a shiftable belt, of a chute to deliver material into the machine by gravity, said chute including a section hinged at its upper end and having its lower end movable vertically toward a horizontal position when empty, a cable connected at one end to the movable chute device and having a portion extending adjacent said belt, and connections between said cable and the belt to cause the shifting of the belt coincidentally with the swinging of said chute section.

3. The combination with a machine for treating material and power means for operating the same including a shiftable belt, of means for delivering material into the machine, said delivering means including a movable chute section, shifting means for the belt including an endless rope and a counterweighted cable connected at one end to the chute device, and connections between said cable and the belt shifting device whereby, upon movement of the movable chute section in either direction the belt will be shifted to either stop or start the machine automatically.

4. In a device of the character set forth, the combination with a machine adapted to treat material and power devices for operating it including a shiftable belt, of a chute comprising stationary spaced sections, a movable section bridging the space aforesaid and movable into and out of alinement with the stationary sections, and a keeper to determine the extent of movement of the movable section in a direction out of alinement, belt shifting devices, and a counterweighted cable extending between the movable chute section and the belt shifting devices whereby, when the chute runs empty, the movable section thereof will be swung out of alinement with the other sections and the belt will be shifted to stop the machine.

5. In a device of the character set forth, the combination with a machine adapted to treat material and power means for operating it including a shiftable belt, of means to deliver material to the machine in either a constant or irregular stream, said delivering means including a chute section pivoted at its upper end and adapted when empty to swing upwardly toward a horizontal position, lever devices secured to the chute section and extending upwardly beyond the pivot thereof, a belt shifting device having constant coöperation with the belt, and a counterweighted cable extending between said shifting device and said lever devices whereby, when the movable chute section is empty, the machine will be automatically stopped by the shifting of the belt in one direction, and when the chute is loaded the machine will be restarted by the shifting of the belt in the opposite direction.

6. In a device of the character set forth, the combination with a machine adapted to treat material and power devices for operating it including a shiftable belt, of a shifting device including an antifriction guide member embracing one run of the belt, an endless cable connected to the opposite ends of said guide member and movable in lines transverse to the run of the belt, means to operate said cable, and a fixed stud coöperating with said guide member to prevent lateral distortion of said guide member.

7. In a belt shifting device for machines of the character set forth, the combination with a laterally shiftable belt, of an antifriction guide member for embracing the belt, a slide comprising a pair of parallel bars connected at one end to said guide member, an endless rope connected at the opposite end of the guide member and to the remote end of the slide, means to actuate said rope in lines transverse to the line of the belt, and a fixed member extending between said parallel bars to prevent shifting of the guide member longitudinally of the belt.

In testimony whereof I have signed my name to this specification in the presence of two subscribing witnesses.

FRANK BELIN DAVENPORT.

Witnesses:
G. A. WILLIAMS,
B. B. DAVENPORT.